Jan. 1, 1935.   S. W. SPARROW   1,986,542
HEAT CONTROL VALVE
Filed Sept. 8, 1932   2 Sheets-Sheet 1

INVENTOR.
Stanwood W. Sparrow
BY
ATTORNEY

Jan. 1, 1935.  S. W. SPARROW  1,986,542
HEAT CONTROL VALVE
Filed Sept. 8, 1932   2 Sheets-Sheet 2

INVENTOR.
BY Stanwood W. Sparrow
P. M. Pomeroy
ATTORNEY

Patented Jan. 1, 1935

1,986,542

UNITED STATES PATENT OFFICE 1,986,542

HEAT CONTROL VALVE

Stanwood W. Sparrow, South Bend, Ind., assignor to The Studebaker Corporation, South Bend, Ind., a corporation of New Jersey Application September 8, 1932, Serial No. 632,118

13 Claims. (Cl. 123—122)

This invention relates to control means for the heat regulating valve for the intake manifold of an internal combustion engine and has for its principal object the provision of control means for such a heat regulating valve which is fully automatic in operation.

A further object lies in the provision of thermostatic control means in addition to gravity or flow controlled means for regulating the application of heat to the intake manifold.

A still further object lies in the provision of means of the character described which is simple and economical to manufacture and apply and which will not readily get out of order in use.

Other objects and advantages of the invention will appear as the description proceeds.

The drawing forming a part of this application shows a preferred mechanical embodiment of the idea of the invention and two modified constructions by means of which the idea of the invention may be satisfactorily carried out. The drawing, however, is for the purpose of illustration only and is not to be considered as limiting the invention, the scope of which is to be measured entirely by the scope of the sub-joined claims.

Figure 1:
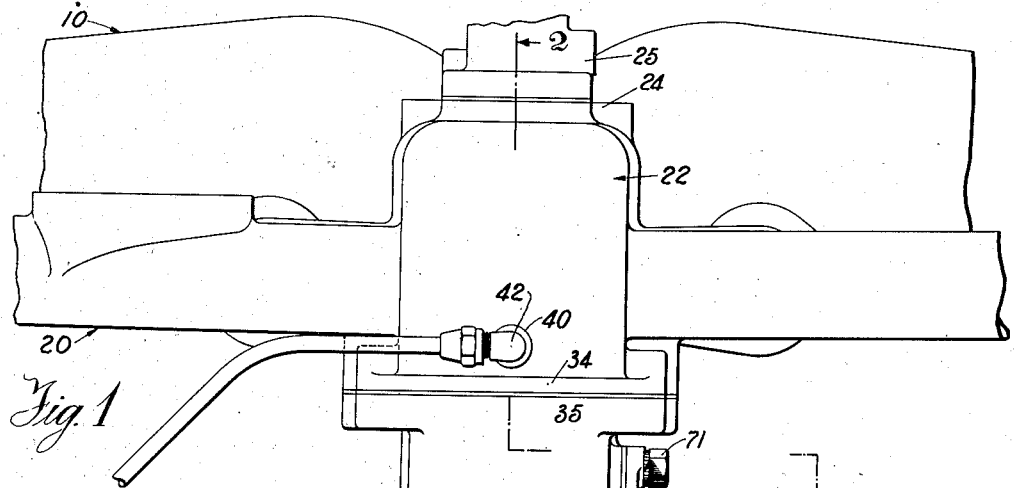
Figure 1 is a vertical elevational view of a fragmentary portion of an exhaust manifold and of a fragmentary portion of an intake manifold for an internal combustion engine, showing the device of the invention applied thereto.

Referring to the drawings in detail and particularly to Figure 1, the numeral 10 generally indicates the exhaust manifold of an internal combustion engine. This exhaust manifold is provided with a centrally located downwardly extending outlet channed 12 particularly illustrated in Figures 2 and 3 which opens into a Y-shaped chamber 13 provided with an upwardly opening branch 14 and a downwardly opening outlet channel 15 to the bottom of which is attached a flange 17 to which an exhaust gas conduit, not shown, may be secured.

The numeral 20 generally indicates an intake manifold provided with a central chamber 22 secured to the top of the upwardly opening branch 14 of the exhaust manifold and provided at the top thereof with a flange 24 to which a carburetor, a fragmentary portion of which is indicated at 25 in Figure 1, is attached. The chamber 22 is provided interiorly thereof with a pair of vertical cylindrical chambers or risers 26 and 27, illustrated in Figures 2 and 3, which lead from the outlet opening of the dual carburetor 25 to the manifold headers 28 and 29 through which the fuel charge is drawn from the carburetor to the cylinders of the internal combustion engine. The risers 26 and 27 are separated from each other by an intermediate wall 30 and are surrounded by an exterior wall 31. An outer wall 32 surrounds the wall 31 in spaced relation thereto and extends from the bottom of the flange 24 to the bottom of the chamber 22 where it is provided with a flange 34 which cooperates with a flange 35 formed at the top of the branch 14 to secure the chamber 22 to the branch 14. The bottoms of the intake headers 28 and 29 are closed by a wall 37 which forms a continuation of the walls 30 and 31 so that the risers 26 and 27 and that portion of the headers 28 and 29 contained within the chamber 22 are completely enclosed. It will be noted from an inspection of Figures 2 and 3 that the wall 32 is spaced from the wall 31 and the bottom wall 37 in such a manner as to provide an annular chamber 33 entirely surrounding the risers 27 and 26 and the portion of the headers 28 and 29 contained within the chamber 22.

The bottom wall 37 is provided with a cylindrical bore 39 which extends centrally beneath the two headers 28 and 29 and through the exterior wall 32 at 40 where it is provided with a drain fitting plug 42. Vents 44 and 45 extend from the bottoms of the headers 28 and 29 respectively into the bore 38 to provide an opening from the bottom of the headers to the exterior of the intake manifold so that any gasoline condensed in the headers or injected therein by over-choking and flooding the downdraft carburetor 25 may be drained away by the drain fitting plug 42. The bottom wall 37 is also provided with a downwardly extending fin or partition 46 which extends to the plane of the lower surface of the flange 34 and extends across the chamber 22 in a direction longitudinally of the intake manifold and substantially bisects the opening in the chamber 22 surrounded by the flange 34. The branch 14 is provided with a diametrical partition 48 which coincides with, and forms a continuation of the partition 46. These two partitions 46 and 48 constitute a baffle generally indicated at 49 which divides the upper portion of the branch 14 into two substantially equal portions. A gasket 50 is interposed between the flanges 34 and 35 and a portion of this gasket extends between the partitions 46 and 48 to provide a gas-tight seal between the chamber 22 and the branch 14.

A transverse pivot pin 52 extends through the downwardly projecting portion 13 of the exhaust manifold at approximately the point where a continuation of the baffle 49 intersects the vertical plane along which the branch 14 joins the branch 12 to constitute the Y-shaped portion 13. This pivot pin 52 carries interiorly of the downwardly projecting portion of the exhaust manifold, a valve generally indicated at 54 having a straight upper portion 55 and a curved lower portion 56.

Figure 2:
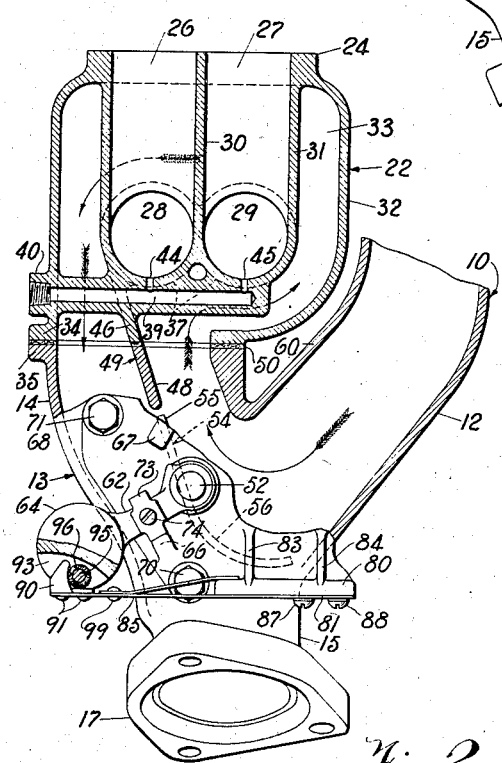
Figure 2 is a vertical sectional view on the line 2—2 of Figure 1, showing the heat controlling valve in position to apply heat to the intake manifold.
Figure 3:
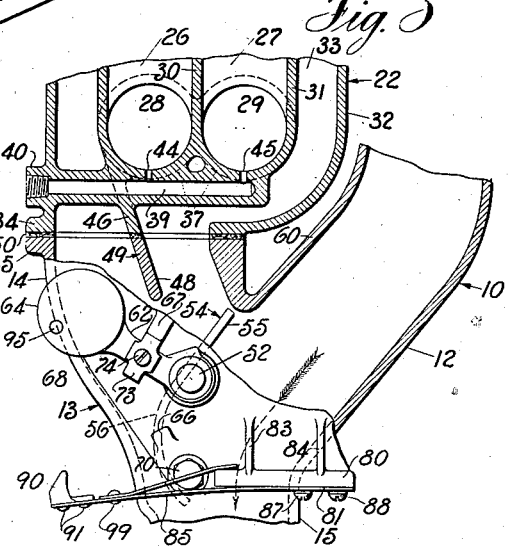
Figure 3 is a view similar to Figure 2 showing the heat controlling valve in position to prevent the application of heat to the intake manifold.

The valve 54 has two operative positions illustrated in Figures 2 and 3. In the position illustrated in Figure 2, which will hereinafter be referred to as the closed position of the heat controlling valve, the valve 54 forms a continuation of the baffle 49 and the curved lower end 56 of the valve substantially closes the lower end of the exhaust channel 12 causing the exhaust gases to flow upwardly through the portion of the branch 14 adjacent to the channel 12 through the annular chamber 33 and out through the portion of the branch 14 remote from the channel 12 and then through the bottom portion 15 of the exhaust manifold to the exhaust gas conduit, not illustrated.

It will be observed that in this operative position of the valve 54, the exhaust gas flowing as indicated by the arrow on Figure 2 will flow around the risers 26 and 27 and the portions of the headers 28 and 29 contained in the chamber 22 and apply heat thereto to heat the fuel charges being drawn through the risers and headers from the carburetor to the cylinders of an internal combustion engine to which the manifold is applied.

In the operative position of the valve 54 illustrated in Figure 3 which will hereinafter be referred to as the open position, the valve is so positioned as to form a substantial continuation of the wall 60 of the exhaust channel 12 and to form a closure for the lower end of the branch 14. In this position of the valve, the exhaust gases flow straight through the exhaust channel 12 and through the lower portion 15 of the exhaust manifold to the exhaust conduit and do not enter the annular chamber 33, in which case there is no heating of the fuel charge by the exhaust gases.

The movement of the valve 54 from one to the other of its operative positions is brought about as follows:

An arm 62 is non-rotatably mounted upon the end of the pivot pin 52 which extends through the portion 13 of the exhaust manifold, and a weight 64 is formed upon the outer end of the arm 62. The gravitational effect of the weight 64 tends to move the valve 54 to the operative position illustrated in Figure 2, in which position the curved lower end 56 of the valve 54 closes the direct outlet of the exhaust gases. When the internal combustion engine is operating at a reduced speed and the flow of exhaust gases therefrom is comparatively small, the force of the exhaust gases impacting against the curved end 56 of the valve 54 will not be sufficient to raise the weight 64 and the exhaust gases will be caused to flow upwardly through the branch 14, through the annular chamber 33 and then downwardly to the branch 14 before leaving the exhaust manifold. As the engine is speeded up and the flow of exhaust gases becomes greater, the force of the exhaust gases impacting against the curved end 56 of the valve 54 will gradually overcome the effect of the weight 64 and will move the valve 54 to the operative position illustrated in Figure 3, in which position the exhaust gases flow directly out of the intake manifold and do not circulate to the chamber 33.

A pair of abutments 66 and 67 are formed on the portion 13 of the exhaust manifold, or as illustrated in Figures 2 and 3, are formed on a plate 68 which is secured to the exhaust manifold by bolts 70 and 71. A stop member 73 is secured to the arm 62 by means of a screw 74 and the contact of this stop member 73 with the abutments 66 and 67 limits the movement of the valve 54 to its two operative positions.

A gravity or flow-control valve as described above has been found to greatly improve the performance of an internal combustion engine to which it is applied. Ordinarily the engine will run smoothly and will not miss at relatively high speed, and it is only at low engine speed that the application of heat to the manifold to increase the evaporation of the fuel is necessary. It has been found, however, that there are cases in which the engine will not run smoothly even at high speed unless exhaust gas heat is applied to the firing charge as it passes through the intake manifold, as when the weather is extremely cold or when the engine has first been started. In order to overcome this difficulty and further improve the performance of the engine, applicant has provided a thermostatic control to act in combination with the gravity or flow-control of the heat controlling valve 54.

As illustrated in Figures 2 and 3, the portion 13 of the exhaust manifold or the plate 68 attached thereto is provided with a laterally offset portion or abutment 80 having a horizontal lower surface 81. This portion 80 is preferably cast integrally with the exhaust manifold or with the plate attached thereto and is braced to the exhaust manifold or the plate by vertical ribs 83 and 84. A flat bi-metallic thermostatic element 85 is secured to the lower surface of the portion 80 as by screws 87 and 88 and provided at its outer or free end with a hook 90 suitably secured thereto as by rivets 91. The weight 64 is provided in the lower portion thereof with a slot 93, into which the hook 90 projects when the weight is in its lowermost position. A pin 95 extends transversely through the slot 93 and is surrounded by a sleeve 96 rotatably mounted thereon, the pin and sleeve being so positioned that when the weight 64 is in its lowermost position and when the thermostatic bar 85 is straight, the hook 90 will engage the sleeve 96 and prevent the weight 64 from rising to change the position of the valve 54.

The bar 85 is so constructed that it is straight as illustrated in Figure 2 when cold. As the temperature of the bar increases, it bends so that the free end thereof and the hook 90 are moved downwardly to release the sleeve 96 and pin 95 as illustrated in Figure 3, thereby releasing the weight and permitting it to move upwardly thereby permitting the valve 54 to assume the operative position illustrated in Figure 3.

A leaf spring 98 is secured to the bar 85 adjacent to the free end thereof by suitable means such as a rivet 99. The free end of this leaf spring rests upon the upper surface of the portion 80 as indicated at 100 and has a frictional contact with the portion 80 to dampen vibrational effects in the bar 85 and prevent chattering thereof.

From the above description it will be observed that when the engine and the manifold are cold, the hook 90 will engage the sleeve 96 and pin 95 and will effectively prevent the weight 64 from rising regardless of the speed of the engine. The valve 54 will then cause heat from the exhaust gases to be applied to the fuel charge flowing through the intake manifold regardless of engine speed until the exhaust manifold heats up to a point at which the thermostatic bar 85 warps sufficiently to release the pin 95 and sleeve 96 from the hook 90. From this time on the valve 54 will be free to fluctuate according to the flow of exhaust gases to the exhaust manifold.

Figure 4:
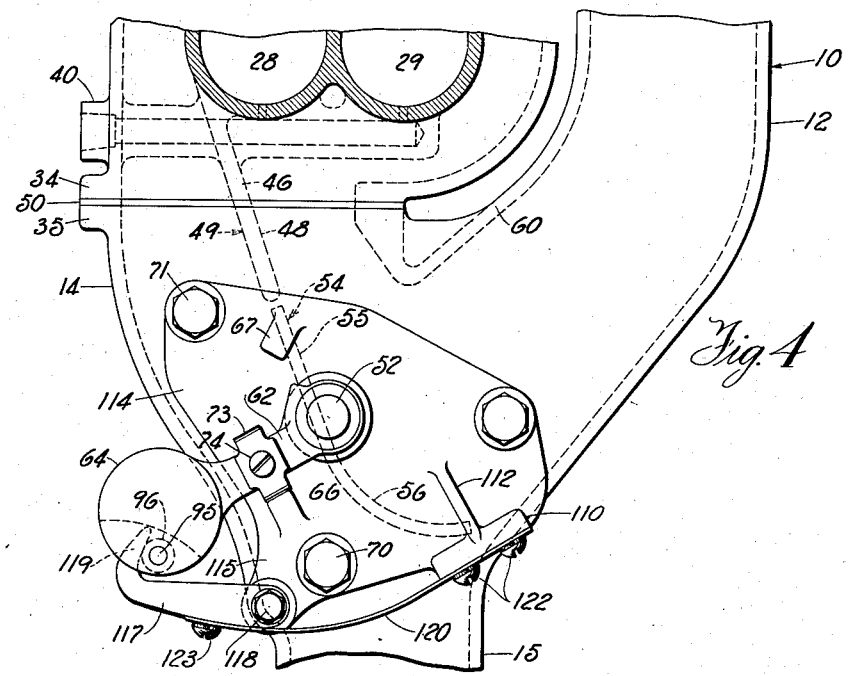
Figure 4 is a vertical elevational view of a somewhat modified form of the invention shown applied to a portion of the exhaust manifold of an internal combustion engine, a portion of the intake manifold of the engine being shown in section.

In the form of the device illustrated in Figure 4, the function is exactly the same as described above, but the actual mechanical embodiment of the idea is slightly different. In this form of the device, the lateral portion or abutment 110 which corresponds to the lateral portion 80 above described is positioned so that its lower surface is at an angle to the horizontal and in this latter case only one rib 112 bracing the portion 110 to the plate 114 has been illustrated. The plate 114 is provided with a downward extension 115 provided with an aperture, not shown, and a hook 117 is pivotally mounted on the downward extension 115 by means of a pivot bolt 118 extending through an aperture in the hook and through the aperture in the downward extension 115. The free end of the hook is provided with an upstanding portion 119 which is adapted to engage with the pin 95 and the sleeve 96 of the construction described above. A curved thermostatic bar 120 is secured to the lower surface of the portion 110 by suitable means such as the screws 122 and is secured to the hook by a suitable means such as the screw 123. In the construction illustrated in Figure 4, it will be observed that the thermostatic bar 120 is curved when the engine is cold or until it has been warmed up so that this bar 120 is somewhat longer than a straight line passing between the screw 123 and the nearest screw 122. When the engine warms up the thermostatic bar 120 tends to straighten out and thus pull the hook 119 away from the sleeve 96 so that when the tip of the hook 119 moves beyond the horizontal axis of the sleeve 96, this will cause complete disengagement of the hook 119 from the sleeve 96 due to the pressure of the exhaust gases against the valve 56 which tends to swing the sleeve 96 upwardly because of its mounting being pivotally supported at 52. As the thermostat cools off and when the valve 56 and its associated parts, including the sleeve 96, return to the position illustrated in Fig. 4, the hook 119 will engage with the sleeve 96 and there be no tendency for the thermostat to unlatch the hook from the sleeve in response to minor fluctuations of temperature of the exhaust manifold, neither will the thermostat 120 vibrate and cause the hook 119 to chatter.

Figure 5:
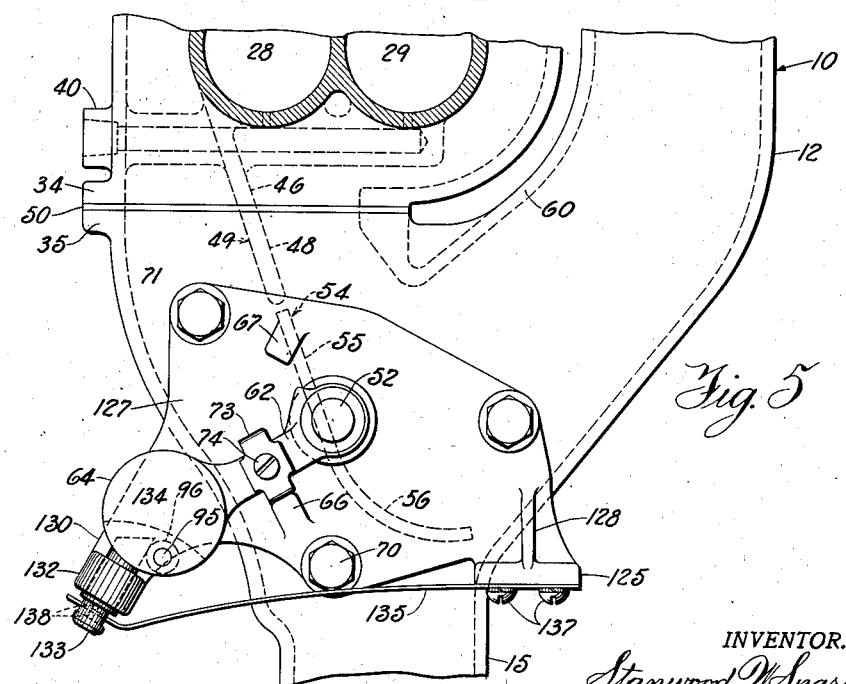
Figure 5 is a view similar to Figure 4 showing an additional modification of the device of the invention.

In the form of the device illustrated in Figure 5, a laterally extending portion or abutment 125 is provided on the plate 127. This laterally extending portion 125 has a horizontal lower surface and is braced to the plate by means of a single vertical rib 128. The plate 127 is provided with a downwardly and outwardly extending portion 130 which carries at the extremity thereof a cylindrical sleeve 132. A pin 133 is slidably mounted in the sleeve 132 and has a beveled inner end 134 adapted to engage the sleeve 96 and lock the weight 64 in its lowermost position. A thermostatic bar 135 has one end secured to the lower surface of the portion 125 by suitable means such as the screws 137, and the free end of the bar passes through a slot in the outer end of the pin 133, pins 138 being interposed between the sides of the bar and the sides of the slot.

It will be observed that in the form of the device illustrated in Figure 5, the thermostatic bar 135 is operative upon changes in the temperature thereof to move the pin 133 through the sleeve 132 to bring the inner end of the pin into position to latch the weight 64 in its lowermost position and to move the pin to cause it to release the weight and, it will also be observed that each form of the invention as described above serves the purpose of maintaining the weight in its lowermost position to maintain the carburetor heat valve closed to force exhaust gases into heat exchanging relationship with the intake manifold until such time as the engine and the exhaust manifold thereof have reached a temperature at which it is no longer necessary to heat the fuel charge being drawn through the intake manifold into the engine cylinders.

While I have shown a preferred form of the device of the invention and two modifications thereof, it is to be understood that the drawing forming a part of this application and the above description does not limit the invention and that such changes in the size, shape and arrangement of parts may be resorted to as come within the scope of the appended claims.

Having now described my invention so that others skilled in the art may clearly understand the same, what I desire to secure by Letters Patent is as follows:

1. In combination with an internal combustion engine, an intake manifold having a heating chamber therein, an exhaust manifold provided with a passage leading to said heating chamber, and a heat control valve gravity urged toward a position to cause exhaust gases flowing through said exhaust manifold to circulate through said heating chamber and urged by the flow of exhaust gases to a position to prevent said exhaust gases from flowing through said heating chamber; a thermostatically actuated latch to maintain said valve in position to cause the exhaust gases to flow through said heating chamber when said engine is below a predetermined temperature, said latch releasing said valve when the engine reaches a predetermined working temperature.

2. In combination with an internal combustion engine, an intake manifold having a heating chamber therein, an exhaust manifold provided with a passage leading to said heating chamber, a valve adapted when in closed position to cause exhaust gas to flow through said heating chamber and when in open position to prevent the flow of exhaust gas through said heating chamber urged by the flow of exhaust gas toward open position, and a weight adapted to urge said valve toward closed position; a thermostatic bar secured at one end to a fixed abutment and means connected to the opposite end of said thermostatic bar adapted to engage said weight to temporarily latch said valve in closed position.

3. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a fixed abutment on the exterior of said exhaust manifold, a thermostatic bar connected at one end to said abutment, a pin secured in said weight and a hook actuated by said thermostatic bar adapted to engage said pin to temporarily latch said valve in closed position and to release said pin upon a predetermined rise in the temperature of said thermostatic bar.

4. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a plate rigidly secured upon the exterior of said exhaust manifold, a thermostat carried by said plate, a pin in said weight and a latch member actuated by said thermostat adapted to engage said pin to temporarily latch said valve in closed position and to release said pin upon a predetermined rise in the temperature of said thermostat.

5. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a pin in said weight, a fixed abutment upon the exterior of said exhaust manifold, a thermostatic bar secured at one end to said abutment, a hook member having an upstanding portion adapted to engage said pin actuated by said thermostat to engage said pin to temporarily latch said valve in closed position and to release said pin upon a predetermined rise in the temperature of said thermostat.

6. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a pin in said weight, a fixed abutment upon the exterior of said exhaust manifold, a thermostatic bar rigidly secured at one end to said abutment, a hook member rigidly secured to the opposite end of said thermostatic bar from said abutment actuated by said thermostatic bar to engage said pin to temporarily latch said valve in closed position and to release said pin upon a predetermined rise in the temperature of said thermostatic bar.

7. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a pin in said weight, a fixed abutment having a substantially horizontal surface on the exterior of said exhaust manifold, a thermostatic bar secured at one end to said horizontal surface and extending substantially in alignment therewith, and a latch member actuated by said thermostatic bar adapted to engage said pin to temporarily latch said valve in closed position and to release said pin upon a predetermined rise in the temperature of said thermostatic bar.

8. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a pin in said weight, a plate rigidly secured upon the exterior of said exhaust manifold, an abutment on said plate, a thermostat rigidly secured to said abutment, and a latch member carried by said plate actuated by said thermostat to engage said pin to temporarily latch said valve in closed position and to release said weight upon a predetermined rise in the temperature of said thermostat.

9. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a plate rigidly secured upon the exterior of said exhaust manifold, an abutment on said plate, an extension formed on said plate, a thermostat rigidly secured at one end to said abutment and a latching element mounted on said extension actuated by said thermostat to engage said weight to temporarily latch said valve in closed position and to release said weight upon a predetermined rise in the temperature of said thermostat.

10. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a fixed abutment on the exterior of said exhaust manifold, a thermostatic bar rigidly secured at one end to said abutment, and a hook carried by the free end of said bar operative to engage said weight to temporarily latch said valve in closed position and to release said weight upon a predetermined rise in the temperature of said bar.

11. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a pin in said weight, a sleeve rotatably mounted on said pin, a fixed abutment on the exterior of said exhaust manifold, a thermostat rigidly secured at one end to said abutment, and a hook carried by said thermostat operative to engage said sleeve to temporarily latch said valve in closed position and to release said sleeve upon a predetermined rise in the temperature of said thermostat.

12. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a plate secured upon the exterior of said exhaust manifold, a thermostat rigidly secured at one end to said plate, a hook pivotally mounted on said plate and operatively connected to said thermostat, said thermostat being longer than the distance between its connections to said plate and said hook whereby said thermostat will move from one to the other of its two operative positions and move said hook from a position to engage said weight to a position to release said weight or vice versa.

13. In combination with an internal combustion engine, an intake manifold having a heating chamber therein, an exhaust manifold provided with a passage leading to said heating chamber, a valve disposed within said exhaust manifold adapted when in closed position to cause exhaust gas to flow through said heating chamber and when in open position to prevent the flow of exhaust gas through said heating chamber urged by the flow of exhaust gas toward open position, and a weight disposed exteriorly of said exhaust manifold and operatively connected with said valve for urging the valve toward closed position; a plate secured to the exterior of said exhaust manifold, a sleeve on said plate, a latch pin slidably mounted in said sleeve, a thermostat mounted on said plate and operatively connected with said latch pin to actuate said latch pin to engage said weight to temporarily latch said valve in closed position and to release said weight upon a predetermined rise in the temperature of said thermostat.

STANWOOD W. SPARROW.